(12) United States Patent
Prabhu et al.

(10) Patent No.: US 11,989,268 B2
(45) Date of Patent: May 21, 2024

(54) DUMMY CLASS FRAMEWORK FOR CONTINUAL SUPERVISED LEARNING APPLICATIONS

(71) Applicant: UnifyID, San Francisco, CA (US)

(72) Inventors: Vinay Uday Prabhu, Redwood City, CA (US); John C. Whaley, Redwood City, CA (US)

(73) Assignee: UNIFYID, San Francisco, CA (US)

( * ) Notice: Subject to any disclaimer, the term of this patent is extended or adjusted under 35 U.S.C. 154(b) by 407 days.

(21) Appl. No.: 17/174,238

(22) Filed: Feb. 11, 2021

(65) Prior Publication Data

US 2021/0248215 A1 Aug. 12, 2021

Related U.S. Application Data

(60) Provisional application No. 62/975,670, filed on Feb. 12, 2020.

(51) Int. Cl.
*G06F 21/31* (2013.01)
*G06F 17/18* (2006.01)
*G06N 3/08* (2023.01)

(52) U.S. Cl.
CPC .............. *G06F 21/31* (2013.01); *G06F 17/18* (2013.01); *G06N 3/08* (2013.01)

(58) Field of Classification Search
CPC ........... G06F 21/31; G06F 17/18; G06N 3/08; H04W 12/68
See application file for complete search history.

(56) References Cited

U.S. PATENT DOCUMENTS

| | | | |
|---|---|---|---|
| 11,126,716 B2* | 9/2021 | Wang | G06N 3/04 |
| 11,127,403 B2* | 9/2021 | Medalion | G06F 40/30 |
| 11,170,320 B2* | 11/2021 | Garg | H04L 67/1095 |
| 11,436,344 B1* | 9/2022 | Juch | G06F 21/602 |
| 11,514,171 B2* | 11/2022 | Dinh | G06N 5/022 |
| 11,526,405 B1* | 12/2022 | Fisher | G06F 11/1464 |
| 11,551,173 B2* | 1/2023 | Bertoni Scarton | G06Q 10/0635 |
| 11,650,749 B1* | 5/2023 | Tran | G06F 3/067 711/165 |
| 2018/0189466 A1* | 7/2018 | Raviv | G06N 3/045 |
| 2019/0164054 A1* | 5/2019 | Lee | G06N 20/00 |
| 2020/0098461 A1* | 3/2020 | Macoviak | G06Q 30/018 |
| 2020/0125706 A1* | 4/2020 | Adir | H04L 9/3231 |
| 2021/0089878 A1* | 3/2021 | Greenewald | G06N 3/082 |

(Continued)

*Primary Examiner* — Viral S Lakhia
(74) *Attorney, Agent, or Firm* — Husch Blackwell LLP; Bryan D. Stewart (57) ABSTRACT

The disclosed embodiments provide a system that identifies a user of an electronic device. During a training mode, the system uses an initial training data set, comprising sensor data from electronic devices associated with a set of initial users, to train a multilayer neural network model to authenticate the initial users. Next, the system uses an additional training data set, which includes sensor data from electronic devices associated with one or more new users, to update a portion of the weights in the trained model so that the updated model can be used to authenticate both the initial users and the one or more new users. During a subsequent mode, the system uses the updated model to authenticate a user of the electronic device based on sensor data contemporaneously received from the electronic device.

23 Claims, 6 Drawing Sheets

(56) References Cited

U.S. PATENT DOCUMENTS

2021/0157945 A1\* 5/2021 Cobb ................. H04L 63/0227
2021/0160687 A1\* 5/2021 Ross ........................ G06N 3/08

\* cited by examiner

```
Uni_Net=vinNet_def(nb_classes=N_uni+1)# Add 1 dummy-node
Uni_Net.compile(loss='categorical_crossentropy',optimizer=adagrad_opt,
        metrics=['accuracy','top_k_categorical_accuracy'])
callback_list=generate_callbacks(VERBOSE_FLAG=1,filepath='model_uni.h5')
Uni_Net.fit(X_train_uni,Y_train_uni,
   batch_size=256,
   epochs=20,
   verbose=1,
   validation_split=0.1,
  callbacks=callback_list)
```

```
class_weights = {}
for i in range(N_uni):
   class_weights[i] = 1
class_weights[DUMMY_NODE] = 10
model_user=modelgen_uni(N_freeze=6,L_R=1.5e-4,LOC_WEIGHTS='model_uni.h5')
model_user_file='model_user_'+str(user_id)+'.hdf5'
callback_list_user=generate_callbacks(VERBOSE_FLAG=0,filepath=model_user_file)
model_user.fit(X_enroll_user,Y_enroll_user,
 batch_size=64, epochs=10,
 verbose=0, validation_split=0.166,
 callbacks=callback_list_user,
 class_weight=class_weights)
pred_mat_user=model_user.predict(X_test_user)
(pred_mat_user[:,DUMMY_NODE]>p_acceptance_threshold).mean()
array([ True, True, True, True, True, True, True, True, True,
     True, True, True, False, True, True, True, True, True,
     True, True, True, True, True, True, True, True, True,
     True, True, True, False, False, False, False, False, True,
     True, True, True, True, True, True, True, True,
     True, True, True, True, True, True, True, True, True,
     False, True, True, True, True, True, True, True, True,
     True, False, True, True, True, False, True, True, True,
     True, True, True, True, True, True, True, True, True,
     False, True, True, True, True, False, True, True, True,
     True, True, True, True, True, True, True, True, True,
     True, True, True, True, True, True, False, True, True])
```

DUMMY CLASS FRAMEWORK FOR CONTINUAL SUPERVISED LEARNING APPLICATIONS

CROSS-REFERENCE TO RELATED APPLICATION

This application claims the benefit of U.S. Provisional Patent Application Ser. No. 62/975,670, entitled "Dummy Class Framework for Continual Supervised Classification Problems," by inventors Vinay Uday Prabhu and John C. Whaley, filed on 12 Feb. 2020, the contents of which are incorporated by reference herein.

BACKGROUND

Field

The disclosed embodiments generally relate to techniques for using sensor data to authenticate users in computing systems. More specifically, the disclosed embodiments relate to a technique that uses a dummy class framework to facilitate continual supervised classification to authenticate users in a computer system.

Related Art

There presently exist a number of techniques for authenticating computer system users. At present, most techniques rely on knowledge-based factors, such as passwords. However, passwords have limitations, especially with respect to the user's experience. Human users are simply not good at creating new passwords, which include strong and unique combinations of characters that are also memorable. Furthermore, passwords are commonly phished or stolen. Moreover, the password-creation rules that websites and services enforce are ever-changing and growing increasingly more complex. To keep up with this complexity, users often reuse passwords across multiple services, or make only small, predictable changes among passwords for different services. Also, because passwords are hard to remember, users often write them down or store them in a file for easy access, which also makes them easier to steal. (Note that the term "authenticate" as used in this specification the appended claims refers to both the process of "authenticating" a user and the process of "re-authenticating" a user.)

Some systems rely on a two-factor authentication technique, which requires a user to carry an extra device to authenticate themselves. However, this can be burdensome to the user because the device can be forgotten, run out of power, or break.

One promising technique is to authenticate a user based on sensor data gathered from sensors located in proximity to the user. For example, accelerometer data from a smartphone can be used to recognize a characteristic gait of a user while the user is walking. Other types of sensor data can be used to authenticate a user, including data from: a multi-touch measurement sensor; a force-touch measurement sensor; a sensor in a mouse; a sensor in a trackpad; or an image sensor.

This sensor-data-based authentication technique operates by first training a machine-learning model on sensor data, and then using the trained model to perform classification operations to recognize sensor data associated with specific users. However, in many use cases, not all of the sensor data is available during the initial training of the model. This may be due to the fact that the sensor data has not been collected, processed, or labeled yet. Or, some of the sensor data may only be available on particular devices, and consequently may not be available for initial training. When additional sensor data eventually becomes available, it is generally necessary to retrain the model from scratch to recognize new classes associated with the additional data. This process can be quite time-consuming, especially for mobile computing devices that have limited computing resources.

Hence, what is needed is a technique for efficiently training a machine-learning model to accommodate additional sensor data without the need to start the training process over from the beginning.

SUMMARY

The disclosed embodiments provide a system that authenticates a user of an electronic device. During a training mode, the system uses an initial training data set, comprising sensor data from electronic devices associated with a set of initial users, to train a multilayer neural network model to authenticate the initial users. Next, the system uses an additional training data set, which includes sensor data from electronic devices associated with one or more new users, to update a portion of the weights in the trained model so that the updated model can be used to authenticate both the initial users and the one or more new users. During a subsequent mode, the system uses the updated model to authenticate a user of the electronic device based on sensor data contemporaneously received from the electronic device.

In some embodiments, the multilayer neural network model includes one or more dummy nodes, which are not associated with specific users during the initial training process, and which become associated with the one or more new users during the updating process.

In some embodiments, the one or more dummy nodes are located in one or more last layers of the multilayer neural network model.

In some embodiments, while updating the weights in the trained model, the system updates weights in one or more last layers in the multilayer neural network model while maintaining weights in other layers unchanged.

In some embodiments, while updating the weights in the trained model, the system uses a least-squares regression technique to update weights in a last layer in the multilayer neural network model.

In some embodiments, while updating the weights in the trained model, the system uses a standard neural network training technique to update weights in the one or more last layers in the multilayer neural network model.

In some embodiments, the additional training data set comprises the sensor data associated with the one or more new users combined with a sampled subset of the sensor data in the initial training data set.

In some embodiments, while authenticating the user, the system additionally identifies the user.

In some embodiments, the contemporaneously received sensor data includes accelerometer data gathered while the user was walking, wherein the accelerometer data reflects a characteristic gait of the user while walking.

In some embodiments, while training the multilayer neural network model, the system makes use of a federated learning technique and/or a differential learning technique to maintain confidentiality of the sensor data.

In some embodiments, the sensor data is obtained from one or more of the following types of sensor: an accelerometer; a touchscreen; a gyroscope; an inertial sensor; an ambient light sensor; an image sensor; a camera; an odor sensor; a temperature sensor; a barometric-pressure sensor; a cellular radio signal strength sensor; a Bluetooth radio signal strength sensor; a near-field communication (NFC) sensor; a network-proximity sensor; an infrared sensor; a magnetometer; a battery sensor; a force-touch measurement sensor; a multi-touch measurement sensor; a sensor in a mouse; a sensor in a trackpad; and a keyboard-timing sensor.

The disclosed embodiments also provide a system that performs a classification operation on sensor data from an electronic device. During a training mode, the system uses an initial training data set, comprising sensor data received from one or more electronic devices, to initially train a multilayer neural network model to perform a classification operation for an initial set of classes associated with the initial training data set. Next, the system uses an additional training data set, which includes sensor data associated with one or more additional classes, to update a portion of the weights in the trained model so that the updated model can perform classification operations for the initial set of classes and the one or more additional classes. During a subsequent mode, the system uses the updated model to perform a classification operation based on sensor data contemporaneously received from the electronic device.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
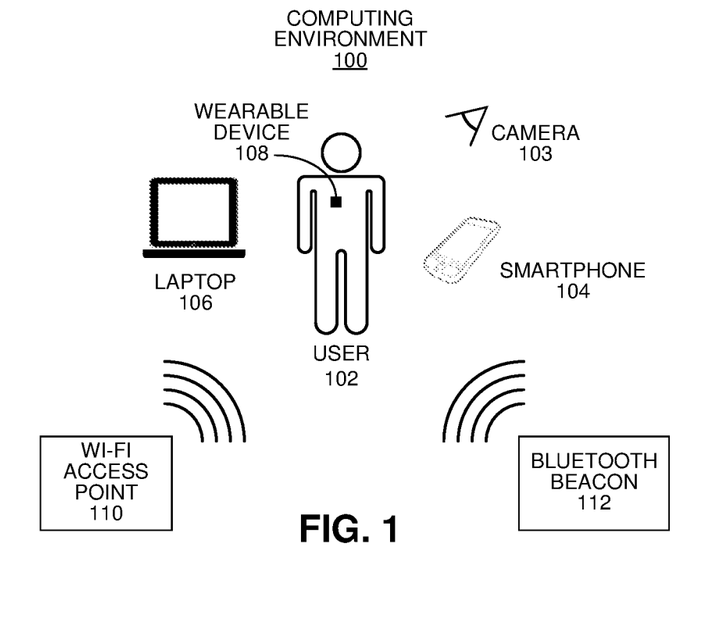
FIG. 1 illustrates various computing devices and sensors in the vicinity of a user in accordance with the disclosed embodiments.

FIG. 1 illustrates various computing devices and associated sensors that comprise a computing environment 100 for a user 102 in accordance with the disclosed embodiments. As illustrated in FIG. 1, the computing environment 100 surrounding user 102 includes a number of portable computing devices, such as a smartphone 104, or a wearable device 108, such as a fitness tracker or a smartwatch. The user 102 may also be operating a laptop computer 106 or possibly a desktop computer (not shown). (Note that the term "user" as employed in this specification the appended claims refers to a "consensually enrolled user" who has provided explicit informed consent to use personal data, including data obtained from sensors located in proximity to the user.)

These computing devices typically include sensors that can be used to authenticate the user, or verify that an action is legitimately performed by the user. For example, mobile devices, such as smartphone 104, wearable device 108, a tablet computer or other personal electronic device, include sensors such as: a touchscreen; an accelerometer; a gyroscope; an inertial sensor; a virtual keyboard-timing sensor; an ambient light sensor; a camera; an odor sensor; a temperature sensor; a barometric-pressure sensor; a cellular radio signal strength sensor; a Bluetooth radio signal strength sensor; a near-field communication (NFC) sensor; an infrared sensor; a battery sensor; a force-touch measurement sensor; a multi-touch measurement sensor; and a microphone. (Note that instead of using a microphone to collect sound and voice, sound and voice can alternatively be captured using motion sensors, such as an accelerometer or a gyroscope.) Laptop computer 106 or a desktop computer may include sensors, such as: a keyboard-timing sensor; a mouse sensor; a trackpad sensor; a Bluetooth radio signal strength sensor; an image sensor or camera; a network proximity sensor; an infrared sensor; and a battery sensor.

Computing environment 100 can include other devices with sensors, which are located in, on or near a person's body, including: medical indigestibles, subdermal implants, electronic tattoos, smart clothing or accessories, and physical authentication devices.

In addition, computing environment 100 can include other devices in the vicinity of user 102 having sensors and network connectivity, such as: a camera 103, a Wi-Fi® access point 110, a Bluetooth™ beacon 112, a home thermostat, automobile components, security systems, televisions and other entertainment devices, and IoT (Internet of Things) devices.

Note that the sensors can also provide side-channel information gleaned from measurements not necessarily designed to directly measure the element in question, such as: an accelerometer; a gyroscope; an ambient light sensor; a magnetometer; a barometer; a proximity sensor; a thermometer; and an image sensor.

Moreover, the data obtained from the sensors can be related to the interaction of multiple devices, such as: (1) the presence of different devices within wireless range or on the same local network; (2) the relative signal strength, noise, packet loss, bandwidth readings, or other statistics among multiple devices, or between a mobile device such as a mobile phone and a fixed device such as a wireless access point; (3) a combination of audio data from multiple microphones that measure ambient noise; (4) audio signals generated by playing sounds on speakers and listening for those sounds or echoes of those sounds on nearby microphones; (5) signals obtained by recording ambient light data from multiple light sensors; and (6) signals that indicate when a device is attached/paired with another device, or comes into range or communication with the other device (or when a device is detached/unpaired or goes out of range).

Also, data obtained from sensors can include semantic information about the usage of a service, such as: (1) a specific sequence of interactions with the service and the timings between the interactions; (2) when there exist multiple ways to perform a task, the particular user flow used to perform the task; (3) mistakes, typos, or misclicks, or other operations that are typically ignored by the service; (4) metadata about specific interactions, such as what part of a button or screen element was clicked, or readings from other sensors before, during, or after a significant event; and (5) responses and changes in user behavior due to perceptible or imperceptible changes in how a service is rendered or results are presented.

Exemplary Authentication Process

Prior to the authentication process taking place, the user performs a number of initialization operations, such as installing software agents on the user's devices, and importing password data from a password-management system. Next, the system learns familiar user behaviors based on information obtained from the user's devices over time to produce one or more models of the user's behaviors. After these initialization operations are complete, the system is ready to perform the authentication process.

Figure 2:
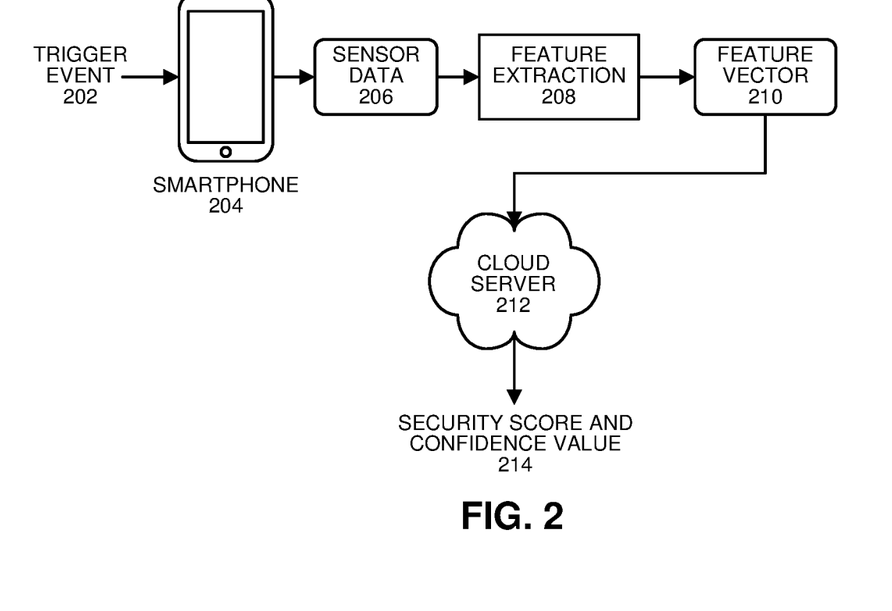
FIG. 2 illustrates an authentication process in accordance with the disclosed embodiments.

Next, as illustrated by the example in FIG. 2, the system performs the authentication process. As shown in FIG. 2, during operation of a smartphone 204, a trigger event 202 occurs, which causes an agent running on smartphone 204 to collect sensor data 206. Next, the smartphone 204 performs a feature-extraction operation 208 on the sensor data 206 to produce a feature vector 210, which is communicated to a cloud server 212. Cloud server 212 then uses a model generated through a machine-learning process to determine a security score and associated confidence value 214 for a user, wherein the security score indicates a probability that the sensor data 206 is associated with the user.

Dummy Class Framework

The disclosed embodiments provide a framework for training machine-learning models to be deployed in supervised classification scenarios where not all of the labeled data is available during the initial training of the model, and there is a need to supplement, fine-tune, or customize a model given additional data without the need to start the training process over from scratch. This may be due to the fact that the data has not been collected, processed, or labeled yet. Another scenario is that some of the data is only available in particular locations or on particular devices, and is therefore not available during initial training. Hence, in general, our system addresses the problem of sequential supervised classification that falls within the field of lifelong learning (LL) or continual learning (CL) where new classes appear sequentially and a model needs to be trained and deployed for each class.

The main idea is to "pre-allocate" a number of dummy output nodes that will be used to represent the classes for which there is no data available at initial training time. Because the actual data for those classes is not available, we can use synthetic data (for example, noise, zeros, or data that is synthesized based on statistical information about the data classes that are anticipated) for those classes during the initial training process. Once the actual class data is later available, we can use the data from the new classes to fine-tune the initial network, using training strategies to avoid catastrophic forgetting and to make the fine-tuning process more efficient than retraining the entire network. This has the benefit that the original data is not needed during the fine-tuning process.

In one example, our system collects an in-domain background labeled N-class data set (such as accelerometric gait) that is used to train a universe/template model (UTM). In this example, there also exists a continual stream of new users/classes coming into the system drawn from outside of the existing data set. Hence, each user/class requires an individual model to include the user/class as one of the output classes. (Because we discuss an exemplary embodiment that uses a neural network model to recognize users, in this application the terms "classes" and "users" are used interchangeably.)

To handle this example, we pre-allocate a set of dummy nodes/classes while training the UTM and use a warm-start pre-training strategy, which leverages statistical information about the data classes that are anticipated in the future. Then, when new user/class data arrives, we use this 'enrollment' data to fine-tune the warm-started UTM while using a set of strategies to reduce the risk of catastrophic forgetting (often associated with continual learning systems) to generate a user-specific model (USM). A model thus generated can then be used in an inference pipeline during a subsequent mode. Within the subsequent mode, classification is performed by passing the input data tensor through the USM and performing a weighted likelihood ratio binary hypothesis test.

In the context of deep neural networks (DNNs), this methodology can be implemented by pre-inserting dummy/ghost nodes in the output softmax layer of the UTM. Note that these dummy/ghost nodes become useful when we are trying to enroll and deploy a model for a cohort of classes or the modes (sub-classes) of a single class to attain more granular classification.

Figure 3:
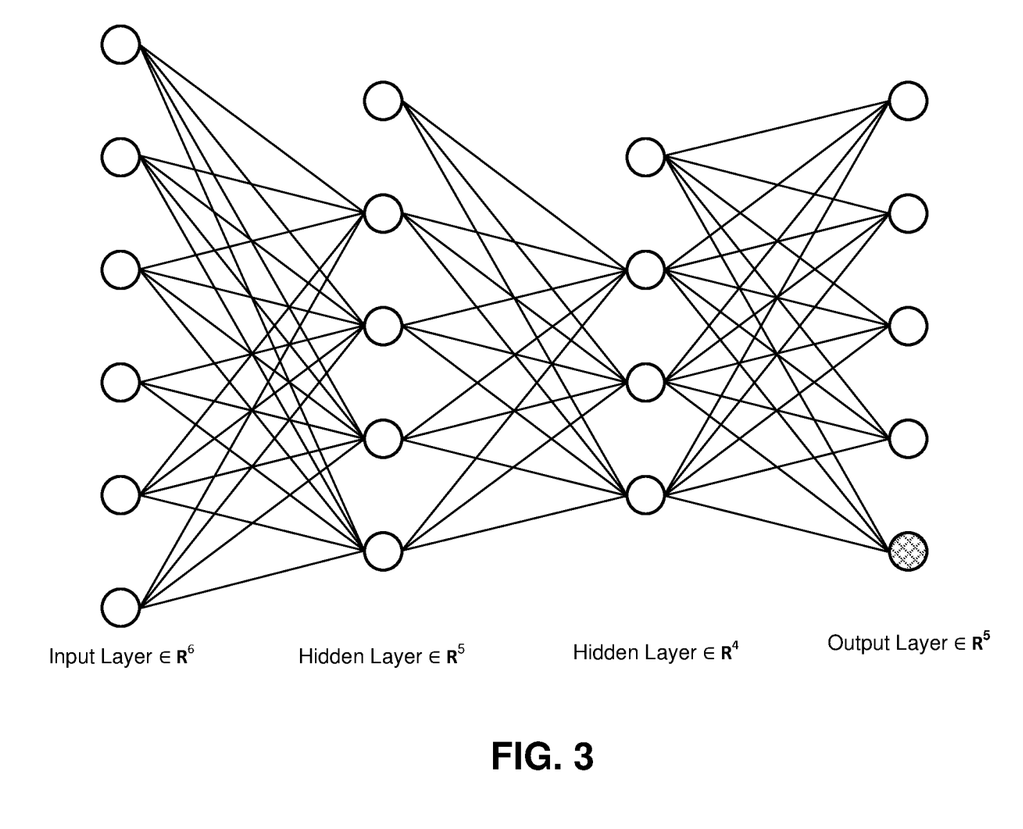
FIG. 3 illustrates an exemplary universal deep-model with a dummy node in accordance with the disclosed embodiments.
Figure 4:
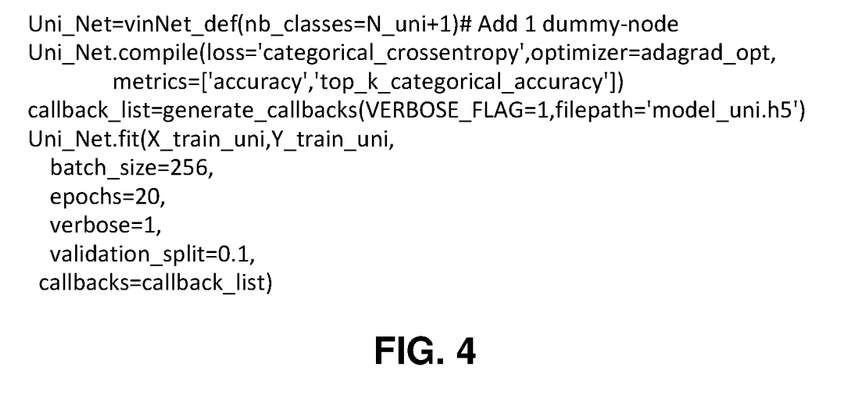
FIG. 4 illustrates code associated with a dummy node in accordance with the disclosed embodiments.
Figure 5:
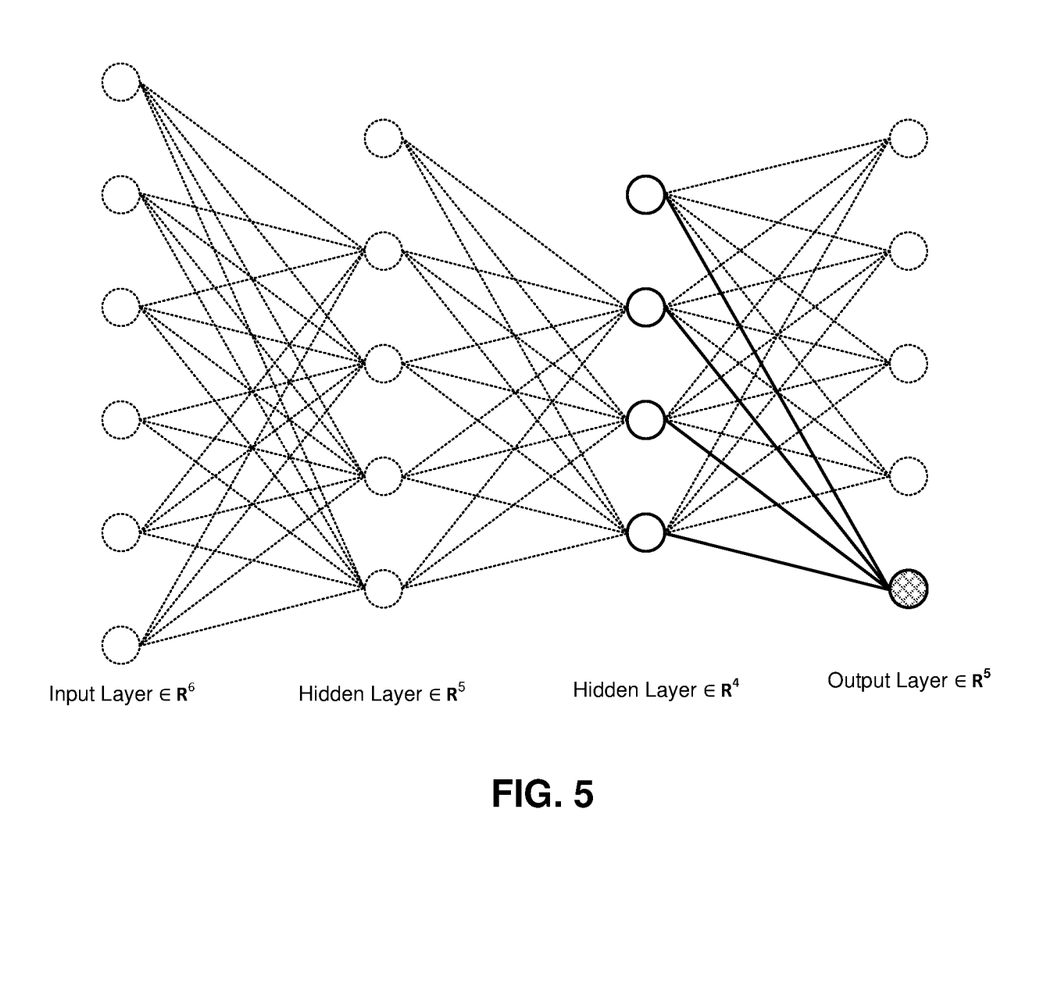
FIG. 5 highlights connections to the dummy node for the deep-model illustrated in FIG. 3 in accordance with the disclosed embodiments.

Our solution generally operates as follows. Step 1: We first train a UTM with dummy nodes dangling at the output layer. (FIG. 3 illustrates such a model, where N=4 and k=1.) This initial training process involves training a "universal deep-model" from a labeled N-class training data set with N+k output-layer nodes, wherein N of the output-layer nodes are associated with the N classes and k of the output-layer nodes are dummy nodes, which are associated with dummy classes. (Exemplary code associated with the dummy node is illustrated in FIG. 4.) Note that at this point, there exists no training data for these dummy nodes, and the values associated with the output nodes are all zeros/random. (See FIG. 5.)

Step 2: Next, we train the dummy nodes with enrollment data. When a new user/class data arrives for the k dummy nodes, we train the weights associated with the last k classes using an appropriate transfer learning strategy, while minimizing catastrophic forgetting. Note that these k nodes may map to either k different users or k different modes of an incoming new user.

Figure 6:
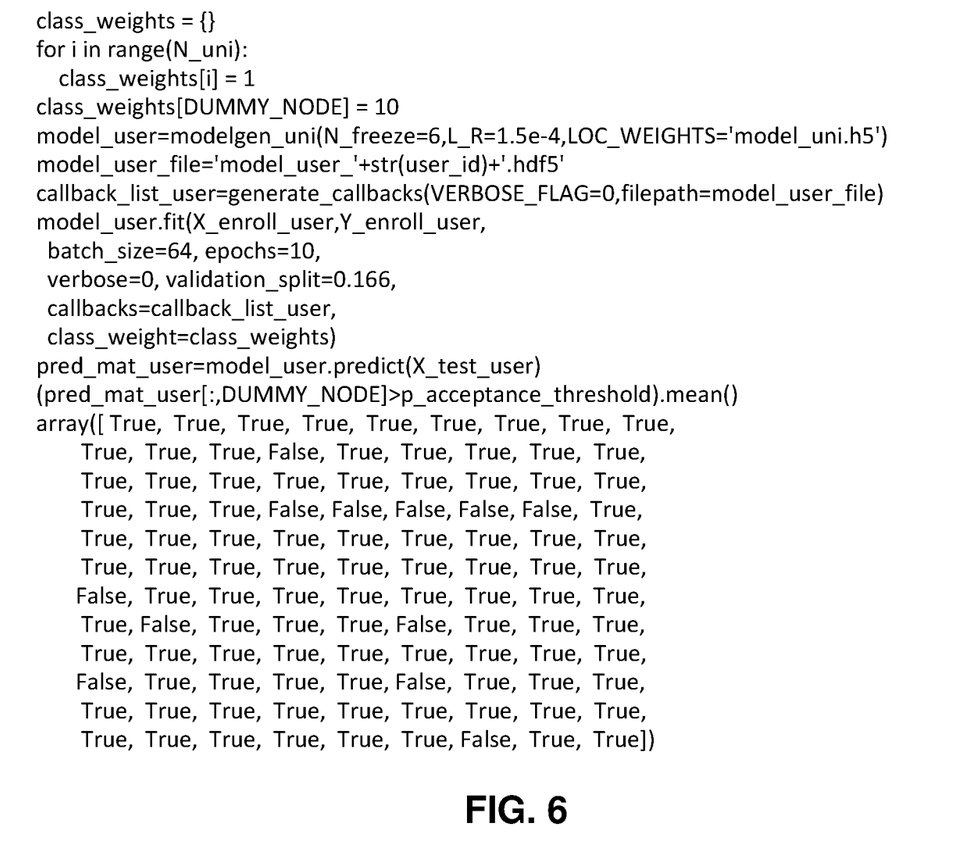
FIG. 6 illustrates additional code associated with the dummy node in accordance with the disclosed embodiments.

Step 3: Finally, we perform an inference during a subsequent mode. When the subsequent mode tensors arrive, they are passed through the neural network and a tensor is classified as belonging to the newly enrolled user's class if the softmax score(s) pertaining to the dummy-node(s) is greater than a specific threshold. (See the exemplary code illustrated in FIG. 6.)

Our new system provides a number of advantages. (1) No change from a conventional DNN architecture is required. (2) The same enrollment and inference code can be reused and shared across all the users. (3) Pre-training of weights can be used to accelerate enrollment. (4) Finally, training of new classes can happen in a distributed manner, and it is not necessary to transmit the original data to the location where the training of new classes occurs; you only need to send the universe/template model (UTM).

Efficiently Determining Weights for the Last Layer

In step 2 above, while training weights associated with the last k classes, the weights can be determined much more efficiently than by using conventional neural network training techniques for the special case of the last layer of the neural network. During this process, we: take the training data for the new classes; pass it through the NN; and cut off the NN before the last layer and you get the features F. So, we have the features F and we know what the ground truth (for the outputs) Y is. The only thing that is missing are the weights W of the last layer. More specifically, for a set of outputs Y and a set of features F, we want to determine a weight matrix W, so that Y=FW. This problem can be solved very efficiently using a least-squares regression technique as is described in more detail below.

The least-squares regression technique proceeds as follows. Start with the following data items and model.
1: (X_template_replay, y_template_replay): replay data to prevent catastrophic forgetting
2: X_user_enrollment: user enrollment data
3: template_model( ): a model trained on 1000 template users Step 1: First obtain the feature-extraction model by slicing the "template mod" trained previously.
model_f=tf.keras.models.Model
    (inputs=template_model.input,
    outputs=template_model.get_layer('pre_softmax'))

Step-2: Next, use the feature-extraction model to extract the features.
F_template_replay=model_f.predict(X_template_replay)
F_user_enrollment=model_f.predict(X_user_enrollment)

Step 3: Prepare the combined tensors for LS regression.
F_comb=np.concatenate([F_user_enrollment,F_template_replay])
Y_user=np.zeros((F_user_enrollment.shape[0],1001))
Y_user[:,1000]=1
encoder_template=LabelEncoder( )
encoder_template.fit(y_template_replay)
Y_template_replay=tf.keras.utils.to categorical(encoder_template.transform(y_template_repla y))
Y_comb=np.concatenate([Y_user,Y_template_replay])

Step 4: Perform the LS regression and extract the associated weights and biases.
from sklearn.linear_model import Ridge
ridge_regress=Ridge( )
ridge_regress.set_params(**{'fit intercept': True})
ridge_regress.fit(F_comb,Y_comb,s_comb)
W_ls=ridge_regress.coef_.T
b_ls=ridge_regress.intercept_

Step 5: Populate the last layer weights with the newly estimated weights and biases.
model_ls=template_model( )
ls_weights=[W_ls_input,b_ls_input] #List of weights and biases
model_ls.layers[−1].set_weights(ls_weights)

Step-6: Save the model.
model_ls.save('Model_user.h5')

Process of Authenticating a User

Figure 7:
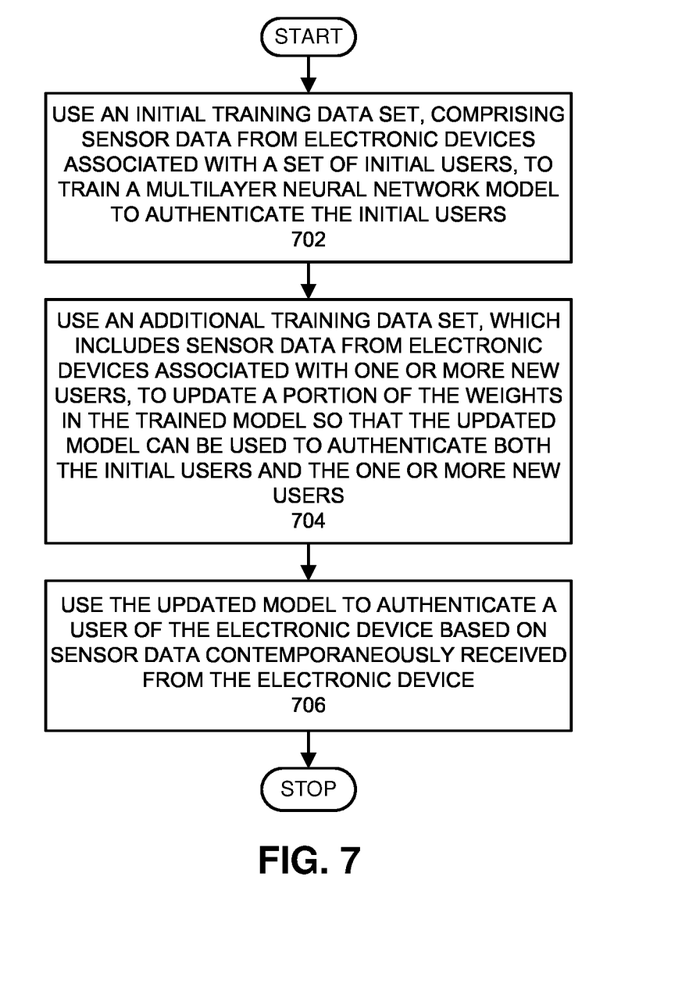
FIG. 7 presents a flow chart illustrating the process for authenticating a user of an electronic device based on sensor data received from the electronic device in accordance with the disclosed embodiments.

FIG. 7 presents a flow chart illustrating a process for authenticating a user of an electronic device based on sensor data received from the electronic device in accordance with the disclosed embodiments. During a training mode, the system uses an initial training data set, comprising sensor data from electronic devices associated with a set of initial users, to train a multilayer neural network model to authenticate the initial users (step 702). Next, the system uses an additional training data set, which includes sensor data from electronic devices associated with one or more new users, to update a portion of the weights in the trained model so that the updated model can be used to authenticate both the initial users and the one or more new users (step 704). During a subsequent surveillance mode, the system uses the updated model to authenticate a user of the electronic device based on sensor data contemporaneously received from the electronic device (step 706).

The above-described authentication process can also make use of a "federated learning technique" to train the neural network model. Federated learning is a machine-learning-based methodology that trains an inferential model across multiple decentralized devices or servers holding local data, without exchanging the local data. (See Kairouz, Peter, et al. "Advances and Open Problems in Federated Learning" arXiv:1912.04977 [cs.LG], 10 Dec. 2019.) By limiting the exchange of local sensor data, federated learning facilitates keeping the local sensor data confidential.

The authentication process can also make use of a "differential privacy" system while training the neural network model. Differential privacy refers to a methodology for publicly sharing information about a dataset by describing the patterns of groups within the dataset while withholding information about individuals in the dataset. (See Irit Dinur and Kobbi Nissim. 2003. Revealing information while preserving privacy. In Proceedings of the twenty-second ACM SIGMOD-SIGACT-SIGART symposium on Principles of database systems (PODS '03). ACM, New York, N.Y., USA, 202-210.) By withholding information about individuals in the dataset, differential privacy also facilitates keeping the local sensor data confidential.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only.

They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method comprising:
   during a training mode,
      training a multilayer neural network model to authenticate one or more initial users based at least in part on an initial training data set comprising sensor data from one or more electronic devices associated with the one or more initial users, wherein the one or more initial users comprises a first user of a first electronic device, and
      updating the trained multilayer neural network model based at least in part on an additional training data set which includes sensor data from one or more additional electronic devices associated with one or more additional users to enable authentication of both the one or more initial users and the one or more additional users, wherein the trained multilayer neural network includes at least one weight and wherein the updating based at least in part on the additional training data updates at least a first weight in the at least one weight; and
   during a subsequent mode,
      authenticating, via the updated trained multilayer neural network model, the first user of the first electronic device based at least in part on sensor data contemporaneously received from the first electronic device.

2. The method of claim 1, wherein the multilayer neural network model includes one or more dummy nodes that become associated with the one or more additional users during the updating the trained multilayer neural network model.

3. The method of claim 2, wherein the one or more dummy nodes are located in one or more last layers of the multilayer neural network model.

4. The method of claim 1, wherein updating the trained multilayer neural network model comprises updating one or more second weights in one or more last layers in the multilayer neural network model while maintaining weights in other layers unchanged.

5. The method of claim 4, wherein updating the trained multilayer neural network model comprises a standard neural network training technique to update the one or more second weights in the one or more last layers in the multilayer neural network model.

6. The method of claim 1, wherein the additional training data set comprises the sensor data from the one or more additional electronic devices associated with the one or more additional users combined with a sampled subset of the sensor data from the one or more electronic devices associated with the one or more initial users.

7. The method of claim 1, wherein the authenticating the first user additionally comprises identifying the first user.

8. The method of claim 1, wherein the contemporaneously received sensor data includes accelerometer data gathered while the first user was walking; and
   wherein the accelerometer data reflects a characteristic gait of the first user while walking.

9. The method of claim 1, wherein the training the multilayer neural network model comprises a federated learning technique and/or a differential learning technique to maintain confidentiality of the sensor data from the one or more electronic devices associated with the one or more initial users.

10. The method of claim 1, wherein the sensor data from the one or more electronic devices associated with the one or more initial users and/or the sensor data from the one or more additional electronic devices associated with the one or more additional users is obtained from one or more of the following types of sensor:
    an accelerometer;
    a touchscreen;
    a gyroscope;
    an inertial sensor;
    an ambient light sensor;
    an image sensor;
    a camera;
    an odor sensor;
    a temperature sensor;
    a barometric-pressure sensor;
    a cellular radio signal strength sensor;
    a Bluetooth radio signal strength sensor;
    a near-field communication (NFC) sensor;
    a network-proximity sensor;
    an infrared sensor;
    a magnetometer;
    a battery sensor;
    a force-touch measurement sensor;
    a multi-touch measurement sensor;
    a sensor in a mouse;
    a sensor in a trackpad; and
    a keyboard-timing sensor.

11. A non-transitory computer-readable storage medium storing instructions that when executed by a computer cause the computer to perform a method, the method comprising:
    during a training mode,
       training a multilayer neural network model to authenticate one or more initial users based at least in part on an initial training data set comprising sensor data from one or more electronic devices associated with the one or more initial users, wherein the one or more initial users comprises a first user of a first electronic device, and
       updating the trained multilayer neural network model based at least in part on an additional training data set which includes sensor data from one or more additional electronic devices associated with one or more additional users to enable authentication of both the one or more initial users and the one or more additional users, wherein the trained multilayer neural network includes at least one weight and wherein the updating based at least in part on the additional training data updates at least a first weight in the at least one weight; and
    during a subsequent mode,
       authenticating, via the updated trained multilayer neural network model, the first user of the first electronic device based at least in part on sensor data contemporaneously received from the first electronic device.

12. The non-transitory computer-readable storage medium of claim 11, wherein the multilayer neural network model includes one or more dummy nodes that become associated with the one or more additional users during the updating the trained multilayer neural network model.

13. The non-transitory computer-readable storage medium of claim 12, wherein the one or more dummy nodes are located in one or more last layers of the multilayer neural network model.

14. The non-transitory computer-readable storage medium of claim 11, wherein updating the trained multilayer neural network model comprises updating one or more second weights in one or more last layers in the multilayer neural network model while maintaining weights in other layers unchanged.

15. The non-transitory computer-readable storage medium of claim 14, wherein updating the trained multilayer neural network model comprises a standard neural network training technique to update the one or more second weights in the one or more last layers in the multilayer neural network model.

16. The non-transitory computer-readable storage medium of claim 11, wherein the additional training data set comprises the sensor data from the one or more additional electronic devices associated with the one or more additional users combined with a sampled subset of the sensor data from the one or more electronic devices associated with the one or more initial users.

17. The non-transitory computer-readable storage medium of claim 11, wherein the authenticating the first user additionally comprises identifying the first user.

18. The non-transitory computer-readable storage medium of claim 11, wherein the contemporaneously received sensor data includes accelerometer data gathered while the first user was walking; and
   wherein the accelerometer data reflects a characteristic gait of the first user while walking.

19. The non-transitory computer-readable storage medium of claim 11, wherein the training the multilayer neural network model comprises a federated learning technique and/or a differential learning technique to maintain confidentiality of the sensor data from the one or more electronic devices associated with the one or more initial users.

20. A system, comprising:
   at least one processor and at least one associated memory; and
   an identification mechanism that executes on the at least one processor, wherein during a training mode, the identification mechanism to:
      train a multilayer neural network model to authenticate one or more initial users based at least in part on an initial training data set comprising sensor data from one or more electronic devices associated with one or more initial users, wherein the one or more initial users comprises a first user of a first electronic device, and
      update the trained multilayer neural network model based at least in part on an additional training data set which includes sensor data from one or more additional electronic devices associated with one or more additional users to enable authentication of both the one or more initial users and the one or more additional users, wherein the trained multilayer neural network includes at least one weight and wherein, to update based at least in part on the additional training data, the at least one processor to update at least a first weight in the at least one weight; and
   wherein during a subsequent mode, the identification mechanism to:
      authenticate, via the updated trained multilayer neural network model, the first user of the first electronic device based at least in part on sensor data contemporaneously received from the first electronic device.

21. The system of claim 20, wherein the multilayer neural network model includes one or more dummy nodes that become associated with the one or more additional users during the update of the trained multilayer neural network model.

22. The system of claim 21, wherein the one or more dummy nodes are located in one or more last layers of the multilayer neural network model.

23. The system of claim 20, wherein, during the update of the trained multilayer neural network model, the identification mechanism to update one or more second weights in one or more last layers in the multilayer neural network model while maintaining weights in other layers unchanged.

* * * * *